United States Patent
Honda et al.

(10) Patent No.: US 6,900,927 B2
(45) Date of Patent: May 31, 2005

(54) NON-LINEAR OPTICAL THIN FILM, NON-LINEAR OPTICAL DEVICE USING THE SAME, AND OPTICAL SWITCH USING THE SAME

(75) Inventors: Mitsutoshi Honda, Hitachi (JP); Yuichi Sawai, Hitachi (JP); Hideto Momose, Hitachiohta (JP); Hiroyuki Akata, Hitachi (JP); Takashi Naito, Mito (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/945,023

(22) Filed: Sep. 21, 2004

(65) Prior Publication Data

US 2005/0031244 A1 Feb. 10, 2005

Related U.S. Application Data

(63) Continuation of application No. 10/378,863, filed on Mar. 5, 2003, now Pat. No. 6,804,043.

(30) Foreign Application Priority Data

Oct. 15, 2002 (JP) .................................... 2002-299754

(51) Int. Cl.[7] ................................................ G02F 1/00
(52) U.S. Cl. ...................... 359/321; 359/320; 359/322
(58) Field of Search ................................ 359/320, 321, 359/322, 299, 290

(56) References Cited

U.S. PATENT DOCUMENTS

| | | | | |
|---|---|---|---|---|
| 5,670,793 A | * | 9/1997 | Miura et al. | 257/64 |
| 6,317,554 B1 | * | 11/2001 | Kosaka et al. | 385/132 |
| 6,554,972 B1 | * | 4/2003 | Ichihara et al. | 204/192.26 |
| 6,700,852 B1 | * | 3/2004 | Yamamoto et al. | 369/100 |

* cited by examiner

*Primary Examiner*—Hung Xuan Dang
*Assistant Examiner*—Tuyen Tra
(74) *Attorney, Agent, or Firm*—Crowell & Moring LLP

(57) ABSTRACT

An optical device is capable of changing signal light to a plurality of paths. The device includes a film, a heating source attached to the film, and a heat radiator plate attached to the other portion of the film. The refractive index of the film varies according to heat excitation, and the film comprises crystal grains of an oxide and amorphous portions present between the crystal grains.

2 Claims, 6 Drawing Sheets

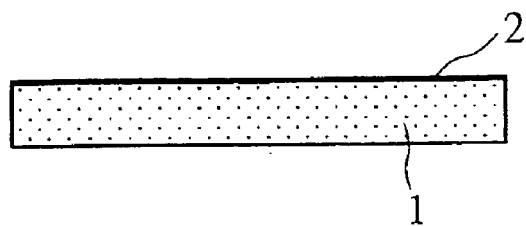
FIG.2A
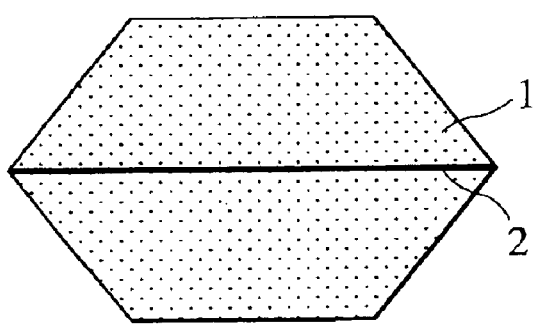
FIG.2B
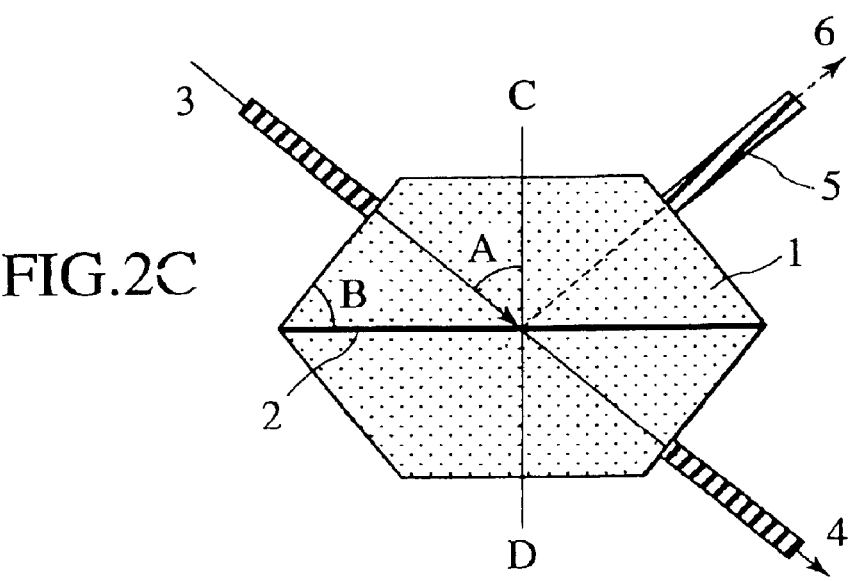
FIG.2C
FIG.2D
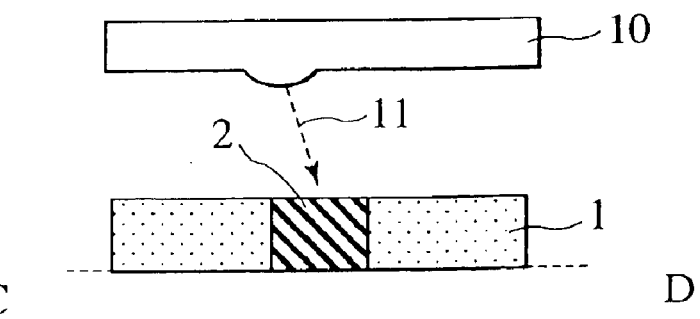

EXCITED LIGHT IRRADIATION (0.2ps)

AT IRRADIATION ENERGY OF 0.3MW/m²

AT IRRADIATION ENERGY OF 0.5MW/m²

TIME (ps)

NON-LINEAR OPTICAL THIN FILM, NON-LINEAR OPTICAL DEVICE USING THE SAME, AND OPTICAL SWITCH USING THE SAME

This application is a Continuation of Ser. No. 10/378,863 filed Mar. 5, 2003, now U.S. Pat. No. 6,804,043.

BACKGROUND OF THE INVENTION

The present invention relates to a non-linear optical film having a non-linear optical characteristic for use in a device for changeover of a signal optical path or for turning-ON/OFF of a signal.

The conventional switching of light information has required a photo-electric conversion means for once converting light information into electrical information and an electro-photo conversion means for reversely converting the electrical information into light information at each relay point. In order to build up a higher-speed light communication system, optical switches (mechanical type optical switches, planar light waveguide type optical switches, mirror type optical switches, bubble type switches, etc.) for directly switching the light information have been developed as described in "Nikkei Electronics" No. 8, Jan. 29, 2000 (non-patent document 1).

For the purpose of developing an optical switch capable of much higher-speed switching, there has been an attempt to achieve a further higher-speed response performance by use of a material having a non-linear optical characteristic. It has been reported that a high-speed and high non-linear optical characteristic can be attained by use of a vitreous thin film in which semiconductor particulates of a ferromagnetic oxide are dispersed, by Japanese Patent Laid-open Nos. 5-224262 (patent document 1) and 2002-72264 (patent document 2).

The optical switch using the thin film as above-mentioned has posed a problem that at the time of changeover of a signal optical path, absorption and/or scattering due to the thin film occurs, causing the attenuation of the signal.

SUMMARY OF THE INVENTION

Accordingly, it is an object of the present invention to provide a thin film that solves the above-mentioned problem, and an optical device using the same.

According to the present invention that solves the above-mentioned problem, there is provided a thin film comprising oxide particles having a corundum type crystal structure and amorphous grain boundaries in the surroundings of the oxide particles. The corundum type structure means a structure in which one more kind of atom is contained in a vacancy in a hexagonal crystal, which can be distinguished by a diffraction image obtained by a TEM (transmission electron microscope) or wide angle X-rays. Such a thin film has a refractive index variation sufficient for application to optical devices, and shows little loss of signals.

When having a mean particle diameter of not more than 25 nm, the oxide particles provide good switching characteristics. The oxide particles, which contain aluminum oxide, iron oxide or gallium oxide, are suitable since they further reduce the loss. In addition, iron oxide is suitable since it increases a variation in refractive index of the thin film. The material oxide constituting the oxide particles can be added in a weight ratio of from 30%, inclusive, to 95%, exclusive, based on the total weight of the thin film.

Rare earth element oxides can be added to the metallic oxide material in a weight ratio of from 1 to 20%. The addition of a rare earth element in the present invention is preferable since it promises a property for a high-speed change of refractive index.

BRIEF DESCRIPTION OF THE DRAWINGS

Other objects and advantages of the invention will become apparent from the following description of embodiments with reference to the accompanying drawings in which:

FIGS. 2A, 2B, 2C, and 2D illustrate a production process of the non-linear optical device of FIG. 1, and the positional relationship between a planar emission laser and the optical device;

DETAILED DESCRIPTION OF THE PREFERRED EMBODIMENTS

Figure 1A:
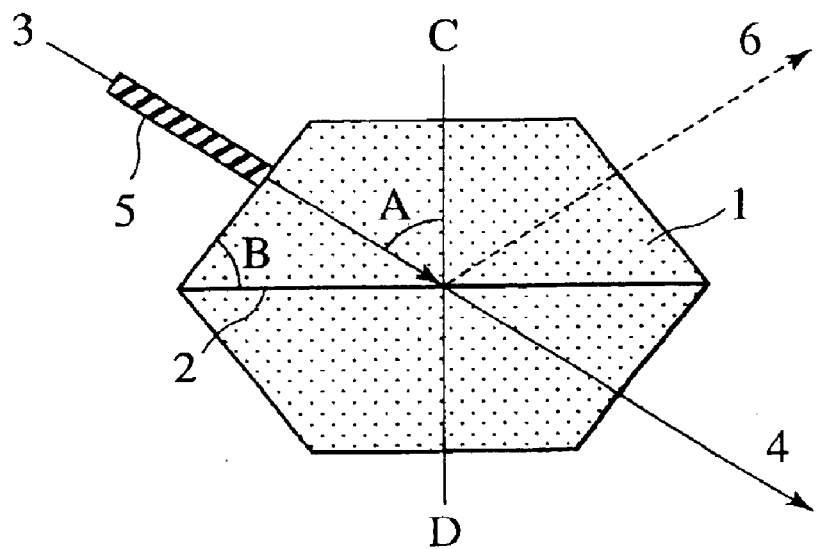
FIGS. 1A and 1B show a non-linear optical device according to the present invention, and the crystal structure of an oxide contained in a thin film thereof, respectively.

The present inventors, as the result of their earnest studies of non-linear optical materials optimum for optical switches, have found out that a non-linear optical thin film having a structure in which columnar oxide particles having a corundum type crystal structure are covered with amorphous grain boundaries shows a large variation of refractive index and shows little inhibition of transmission of light. That is, the non-linear optical thin film according to the present invention comprises corundum type crystal grains of an oxide and amorphous portions between the crystal grains. This material shows a large variation of refractive index upon irradiation with light having intensity not less than a predetermined intensity, and, therefore, the material when formed on a substrate can be applied to an optical device such as an optical switch for changeover of an optical path for signal light. Furthermore, the material makes it possible to set the extinction coefficient for light with a wavelength of 1.55 $\mu$m to 0.04 or less, and it is possible to obtain an optical device having a low-loss characteristic by application of the material. In this case, it is possible to produce an optical device having a signal transmittance of not less than 80% (signal loss: 20% or less). The inventors have also investigated optical devices using a compound having the NaCl type crystal structure (for example, FeO) and optical devices using a compound having the spinel type crystal structure (for example, $Fe_3O_4$), but it has been found that the use of the oxides having these crystal structures leads to a large loss of light at the time of transmission of signal light.

The oxide is preferably mixed in a weight ratio of from 30%, inclusive, to 95%, exclusive, based on the total weight. When the oxide is aluminum oxide, iron oxide or gallium oxide, the loss can be further reduced, and when the oxide is iron oxide, a large variation of refractive index can be achieved.

The non-linear optical thin film according to the present invention has a non-linear characteristic, and the optical device using the same is a device for changeover of an optical path for signals, for turning-ON/OFF or interrupting of the signals, or for like purposes.

Generally, the refractive index of a material varies little according to the light intensity or the like. However, a material having a non-linear optical characteristic shows a reversible or irreversible change in refractive index according to the intensity of light with which it is irradiated, or the like. A material showing a larger variation of refractive index can more easily provide a refractive index change necessary for changeover of an optical path, and shortens the time required for the optical path changeover. With such a material, therefore, it is possible to produce an optical device showing stable performance and high-speed response, and thereby to process data at high speed. The optical device obtained by application of the present invention can show a response time of not more than 1 $\mu$s; according to the excitation conditions and the thin film composition, it is possible to achieve a response time of not more than 15 ns, and, further, a response time of not more than 0.5 ps.

In the case of a material showing a high extinction coefficient of the thin film, the transmittance of light of the material is low, so that signals would be attenuated or lost upon transmission or the like. For practical use, therefore, it is necessary to set the extinction coefficient to about 0.04 or less in the communication wavelength range.

The optical device must be irradiated with signal light from the direction of an angle of not less than 60 degrees, relative to the growth direction at the time of formation of the non-linear optical thin film (namely, the growth direction of the crystal). In this case, energy can be supplied by an excited light source, electricity, heat or the like as an external field for exciting the thin film.

Besides, the wavelength of the excited light source must be in the range of from 650 to 800 nm to perform changeover of optical path.

EXAMPLES

Now, some examples of the present invention will be described in detail below, referring to the drawings.

Example 1

Figure 1B:
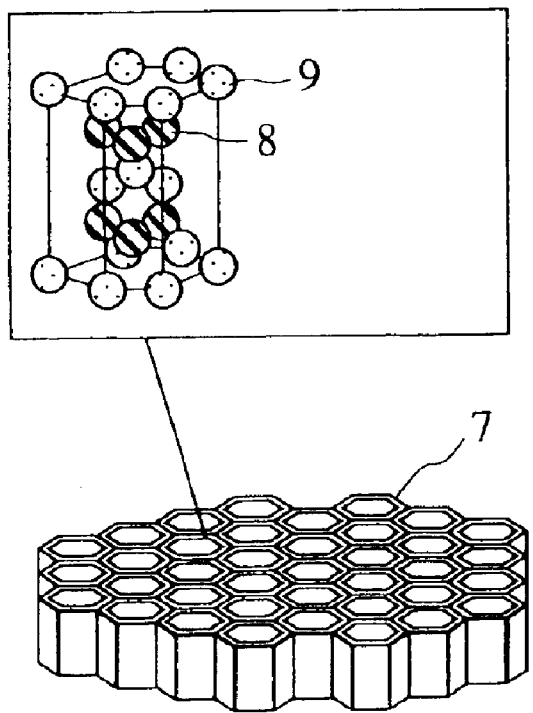

FIGS. 1A and 1B show a device for carrying out this example and a thin film used for the device, respectively. FIG. 1A is a schematic diagram showing a device structure investigated, and FIG. 1B is a schematic diagram showing a non-linear optical thin film used for the device, which comprises an oxide having the corundum type crystal structure and an amorphous oxide component. In the figures, numeral 1 denotes a glass substrate, 2 denotes a non-linear optical film comprising a metallic oxide and an amorphous oxide forming grain boundary portions thereof, 3 denotes signal light, 4 and 6 denote emitted light, 5 denotes a fiber, 7 denotes the amorphous portion, 8 denotes an oxygen atom, and 9 denotes a metal atom. In addition, character A denotes the angle of incidence of signal light, and B denotes the inclination angle of the substrate.

The glass substrate 1 was obtained by doping quartz glass with titanium oxide, and so conditioning as to obtain a refractive index of 1.65. By conditioning the refractive index of the substrate, it is possible to selectively produce either of an optical device through which light is transmitted in an excited condition and an optical device that reflects the light in an excited condition.

The angle of incidence varied in the following is the angle indicated by A in FIG. 1A, which is equal to angle B of an end face of the quartz glass substrate on which the signal light is incident. As a result, the signal light is always incident on the substrate 1 at right angles.

Next, a method of producing the device structure according to this example will be shown referring to FIGS. 2A to 2D.

A non-linear optical film was vertically built up to a film thickness of 750 nm on a quartz glass substrate measuring 10 mm×10 mm×1 mm (thickness). The film thickness was calculated by use of the Step method and an ellipsometer.

(A) While the film was built up by the RF sputtering method in this example, the film may also be formed by CVD or vacuum vapor deposition. It should be noted here that sputtering is preferable, since it can form films with a wider range of composition.

In the sputtering, $Fe_2O_3$ and $SiO_2$ were used as sputtering targets, in a weight ratio of 70:30. The sputtering was conducted by use of the targets of 6 inch in size and a sputter gas of Ar+20% $O_2$ at a pressure of 5 mTorr.

(B) Side faces of the substrate 1 provided thereon with the non-linear optical film 2 in (A) and the substrate 1 not provided with the non-linear optical film 2 were processed at a predetermined angle, and both the substrates were adhered to each other as shown in FIG. 2B.

(C) A quartz-based fiber 5 was attached to the processed side face of the substrate with an adhesive to obtain a non-linear optical device. While Araldite (trade name) was used as the adhesive in the present example, a method of applying a photo-curable adhesive and thereafter curing the adhesive by irradiation with UV rays may also be adopted.

(D) Using a sectional view taken along line C–D of FIG. 2C, a method of irradiating with excited light by a planar emission laser will be shown. A planar emission laser 10 was mounted at a position orthogonal to the non-linear optical film 2 so that a predetermined position (a branch point of signal light) of the non-linear optical film 2 can be irradiated with laser light. The wavelength of the planar emission laser was 775 nm. The non-linear optical film 2 is irradiated with the excited light 11 emitted from the planar emission laser, along the arrow.

Figure 3:
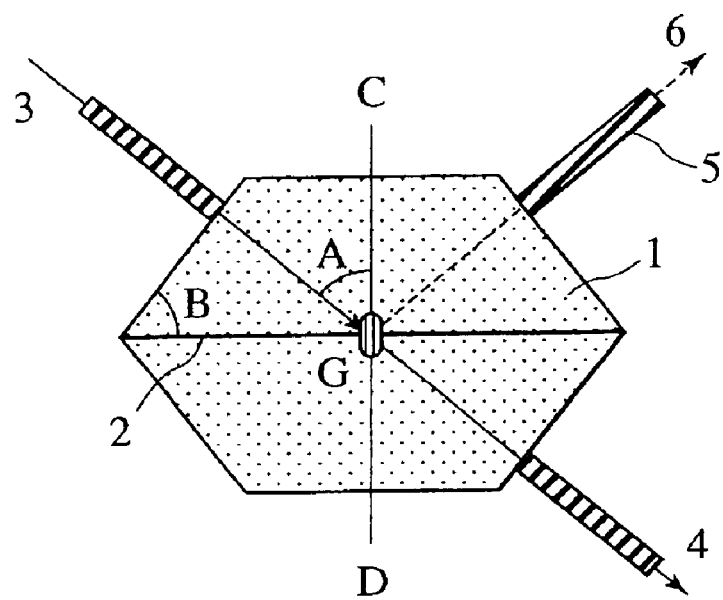
FIG. 3 shows the structure of an optical switch irradiated with excited light 11 from the planar emission laser 10.

The switching characteristics of the non-linear optical device produced as above were examined. FIG. 3 illustrates the method of examining the switching characteristics. The angle of incidence A of the signal light entering the thin film was fixed at 70°, and the wavelength was set to 1550 nm, which is the communication light wavelength. Where the thin film portion was not irradiated with light from a planar emission laser, the signal light was outputted from a position indicated by numeral 4. In FIG. 3, the location G is the position of irradiation with excited light. When the location G in FIG. 3 was irradiated with the light from the planar emission laser at an intensity of 0.3 MW/$m_2$, the position of the output light was changed from numeral 4 to numeral 6, whereby it was confirmed that the switching was achieved. When the response speed (the period of time after stoppage of irradiation with excited light until the signal light returns to its original optical path) at this time was measured, it was as very short as 15 ns.

Figure 4:
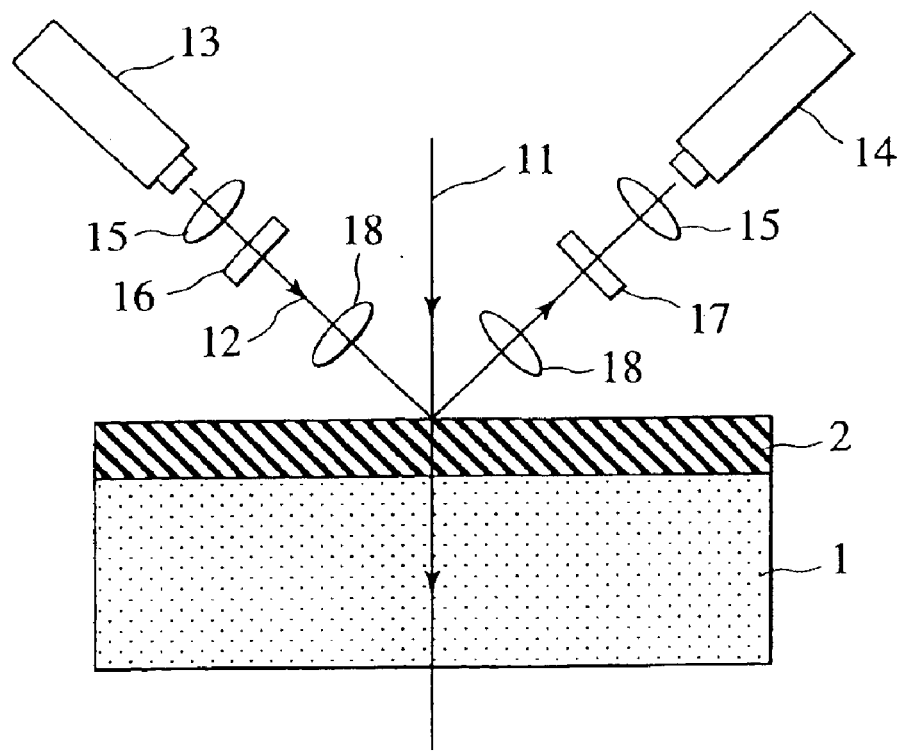
FIG. 4 illustrates a measuring system for measuring the refractive index of a thin film.

Furthermore, variation of the refractive index of the thin film constituting the above optical device was measured. FIG. 4 illustrates the measurement system, in which numeral 11 denotes excited light, 12 denotes signal light, 13 denotes a light source of the signal light, 14 denotes a receiver of the signal light, 15 denotes a collimator lens, 16 denotes a polarizer, 17 denotes an analyzer, and 18 denotes a condenser lens.

In this examination, a specimen comprising only a non-linear optical film 2 formed on a glass substrate 1 was prepared. The measuring light was set to s polarized light and p polarized light relative to the specimen, and refractive index and extinction coefficient were measured by use of an optical system based on the elliptic polarization method (ellipsometry) for measuring the refractive index from the difference in reflectance between the s polarized light and the p polarized light due to the non-linear optical film 2.

A femtosecond laser with a wavelength of 775 nm which permits easy control of oscillation driving was used as a light source of the excited light 11. The maximum output of the laser was 8 mW, and the light was condensed on the thin film by a lens. A femtosecond laser with a wavelength of 1550 nm which is used in communication was used to emit signal light (measuring light) 12. The excited light and the measuring light each had a frequency of 1 kHz, and the laser irradiation time per period was set to 0.2 ps. The measurement of response time was conducted through calculation by varying the frequency interval of the excited light 11 and the signal light 12. Besides, in order that the specimen would not be excited by the signal light (measuring light) 12, the measurement was conducted by use of a laser power weak enough relative to the intensity of the excited light 11.

Figure 5:
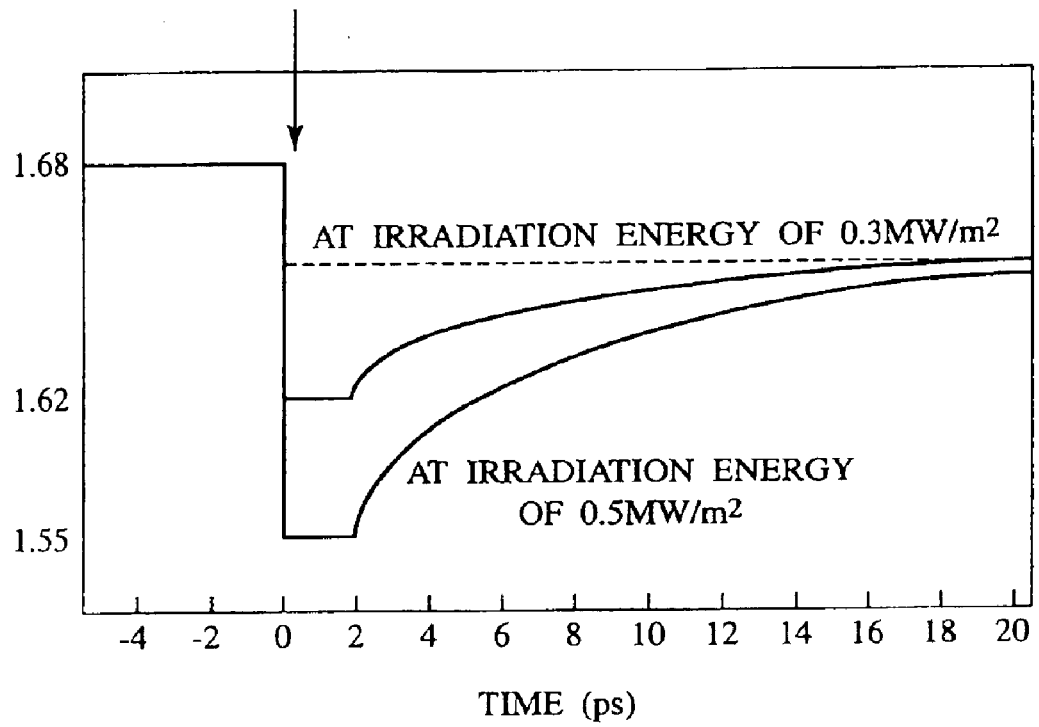
FIG. 5 is a diagram showing an example of the variation of refractive index when the non-linear optical film 2 is irradiated with excited light 11.

FIG. 5 is a diagram showing an example of the refractive index variation when the non-linear optical film 2 was irradiated with the excited light 11. Upon irradiation with laser light, the refractive index of the thin film was rapidly changed to 1.55 or 1.62, and it returned to 1.66 in a period of time on the ps order after the stoppage of irradiation. Thereafter, the refractive index returned to 1.68 in a period of time on the ns order.

Where the measuring wavelength was 1550 nm, the refractive index under the condition where the optical film was not irradiated with the excited light 11 was 1.68. The refractive index was reduced according to the intensity of the excited light 11, and it was changed to 1.62 at an excited light intensity of 0.3 MW/$m_2$ and to 1.55 at an excited light intensity of 0.5 MW/$m_2$.

Furthermore, response characteristics of the refractive index variation were examined by varying the laser wavelength of the excited light 11. The power of the excited light 11 was set to 0.3 MW/$m_2$, which had been used in the above-described examination. Table 1 shows the results of the examination of the response characteristics of refractive index variation in relation to variation of the excited light wavelength.

TABLE 1

| Excited light wavelength | Refractive index variation | Switching | Response speed |
| --- | --- | --- | --- |
| 400 nm | 0.80% | X | — |
| 450 nm | 0.70% | X | — |
| 500 nm | 0.60% | X | — |
| 550 nm | 0.80% | X | — |
| 600 nm | 0.90% | X | — |
| 650 nm | 2.70% | ⊚ | 13 ns |
| 700 nm | 2.70% | ⊚ | 12 ns |
| 750 nm | 2.60% | ⊚ | 11 ns |
| 800 nm | 2.70% | ⊚ | 13 ns |
| 850 nm | 0.40% | X | — |
| 900 nm | 0.60% | X | — |
| 950 nm | 0.70% | X | — |
| 1000 nm | 0.60% | X | — |
| 1050 nm | 0.80% | X | — |
| 1100 nm | 0.60% | X | — |
| 1150 nm | 0.60% | X | — |
| 1200 nm | 0.40% | X | — |

This table shows the excited light wavelength and the refractive index variation (Δn/n). From this table it is seen that the refractive index was largely reduced and varied by not less than 2% at an excited light wavelength ranging from 650 to 800 nm.

From the results, the mechanism of refractive index variation was assumed. The main component contained in the thin film used in the examination and causing the non-linear optical effect is $Fe_2O3$, and the absorption end (the wavelength at which light absorption begins) of this substance is around 500 nm. In the results of the examination, however, the refractive index variation was greatest not when the excited light wavelength was at the absorption end of 500 nm but when the excited light wavelength was in the range from 650 to 800 nm. This is probably caused by two-photon absorption. The two-photon absorption is the phenomenon in which a non-linear optical material is excited by a combination of two kinds of optical energy, and the excitation energy is represented by the sum of the energy of light 1 and the energy of light 2.

The signal light (wavelength: 1550 nm), the excited light (wavelength: 650 to 800 nm) and the absorption end (wavelength: 500 nm) used in the examination are transformed into energies of 0.8 eV, 1.6 to 1.9 eV, and 2.5 eV, respectively. The relationship among these energies can be summarized roughly as "(the energy of the signal light)+(the energy of the excited light)=(the energy of the absorption end)". This relationship represents the phenomenon called two-photon absorption. The fact that the refractive index variation was greatest not when the excited light wavelength was at the absorption end of 500 nm but when the excited light wavelength was in the range from 650 to 800 nm is probably due to the two photon absorption phenomenon.

As described above, in the case of the non-linear optical film containing iron oxide, the refractive index varies greatly upon irradiation with light having a wavelength of from 650 to 800 nm. Therefore, in the optical device produced by application of the non-linear optical film, it is preferable to set the wavelength of the light source for excitation in the range of 650 to 800 nm.

In addition, also as for other oxides than iron oxide which similarly have the corundum type crystal structure, it is assumed that the refractive index varies greatly upon irradiation with light having a wavelength of from 650 to 800 nm. Since the measurement of light absorption relative to the wavelengths of compounds having the same crystal structure produces similar-shaped results, it is estimated that the compounds have the same kind of energy band. In addition, since the cause of energy excitation is the same, these compounds are probably excited with energy approximate to that for iron oxide. Therefore, in the case of producing an optical device by use of a thin film having the corundum type crystal structure, it is desirable to add an exciting light source for irradiation with light having a wavelength of from 650 to 800 nm.

Next, refractive index variation, extinction coefficient, response speed, and switching characteristic at a communication light wavelength (1.55 μm) of a thin film relative to angle of incidence were investigated. Table 2 shows refractive index variation, extinction coefficient, switching characteristic, and response time of a non-linear optical thin film in relation to the angle of incidence examined by the above-mentioned method.

TABLE 2

| Angle of incidence | Refractive index variation | Switching | Response speed |
|---|---|---|---|
| 40 | 0.60% | X | — |
| 45 | 0.80% | X | — |
| 50 | 0.60% | X | — |
| 55 | 0.40% | X | — |
| 60 | 0.50% | X | — |
| 65 | 2.00% | ⊙ | 12 ns |
| 70 | 2.80% | ⊙ | 13 ns |
| 75 | 2.70% | ⊙ | 14 ns |
| 80 | 2.00% | ⊙ | 13 ns |
| 85 | 0.40% | X | — |

Here, the switching characteristic was rated by a method in which the case where at least 90% of the intensity of the output light is outputted to another optical path upon irradiation which excited light is indicated by symbol ⊙, and the case where the optical path is not changed over and the case where the output light is little detected by a detector are indicated by symbol X.

from the table it is seen that the switching characteristic was observed at an angle of incidence of from 65 to 80°. The refractive index was reduced by not less than 2% at an angle of incidence of from 65 to 80°, and the refractive index variation was less than 2% at the angles of incidence of less than 65° and more than 80°. Where the refractive index variation was small as above, the transmission/reflection of the signal was not changed over to a degree sufficient for switching, and good switching characteristic could not be obtained.

Example 2

Figure 6:
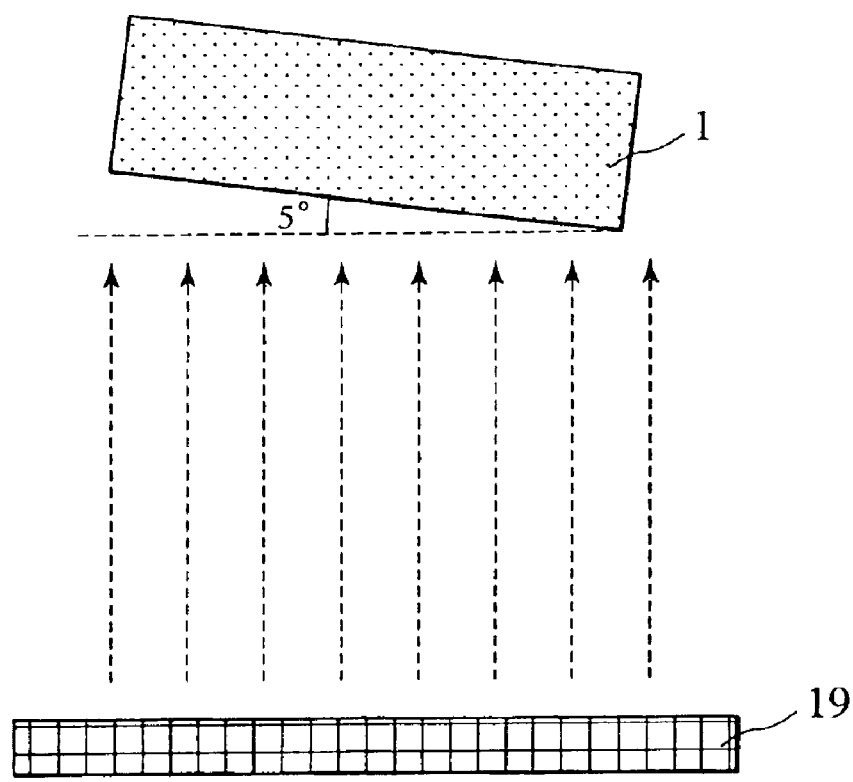
FIG. 6 illustrates a method of forming a film with an inclination angle.

The non-linear optical thin film in Example 1 was obtained by growing crystal grains in a columnar shape. When the crystal grains are grown in a columnar form from the substrate, a great optical anisotropy results. Now, the results of the case where a non-linear optical thin film was grown obliquely, for investigation of the anisotropy of the film, will be shown below. FIG. 6 illustrates the method of growth, in which numeral 19 denotes a sputter target, and 1 denotes a glass substrate. As shown in the figure, the non-linear optical thin film was grown with the substrate inclined by an angle of 5°.

When a cross section of the thin film portion thus formed was observed under a TEM (transmission electron microscope), it was observed that the thin film had been grown obliquely relative to the substrate, and it was confirmed that the direction of growth coincided with the inclination angle of 5°. An optical device was produced by application of the above-described production steps (B) and (C) on the glass substrate thus obtained.

Figure 7:
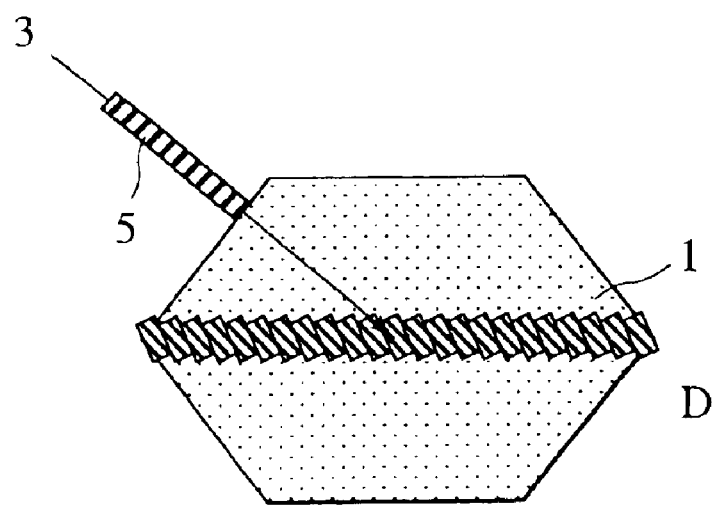
FIG. 7 shows a non-linear optical device comprising a thin film formed with an inclination angle.

FIG. 7 shows the manner of introduction of incident light to the device. As shown in the figure, such an adjustment was made that the incident light would be introduced in accordance with the direction of inclination.

For the specimen thus provided with the inclination angle, refractive index variation, extinction coefficient, switching characteristic, and response speed at a communication light wavelength of the thin film in relation to the angle of incidence were investigated. Table 3 shows the results.

TABLE 3

| Angle of incidence | Refractive index variation | Switching | Response speed |
|---|---|---|---|
| 40 | 0.80% | X | — |
| 45 | 0.70% | X | — |
| 50 | 0.60% | X | — |
| 55 | 0.50% | X | — |
| 60 | 2.00% | ⊙ | 12 ns |
| 65 | 2.70% | ⊙ | 13 ns |
| 70 | 2.70% | ⊙ | 12 ns |
| 75 | 2.60% | ⊙ | 14 ns |
| 80 | 2.70% | ⊙ | 13 ns |
| 85 | 0.40% | X | — |

From the results it is seen that the switching characteristic was observed at the angles of incidence in the range of 60 to 80°. Combining the results with the result of the preceding example, it is seen that the angle at which the switching characteristic begins coincides with 60°, i.e., the value obtained by subtracting the angle of inclination from the angle of incidence, and it is an indispensable condition to set the film growth angle based on the growth direction and the direction of incidence to be at least 65°.

That is to say, it has been concluded that when the signal light is passed in a specified direction relative to the thin film, the optical path of the signal light is changed to the objective direction without any attenuation of the quantity of light. Thus, the advancing path of light can be efficiently changed over by designating the incidence direction of light. This is probably due to the fact that since the thin film has anisotropy, it resists reacting to the light coming from a lateral direction relative to the columnar crystals, and the refractive index variation differs according to the angle of incidence.

As has been described above, the optical device provided with the thin film containing an oxide having the corundum type crystal structure, by further designating the incidence direction of light, shows a high-speed change of optical path for signals and can provide an optical switch which shows little loss of signal light.

Example 3

An optical switch was produced by use of a non-linear optical device. Irradiation with laser light from a planar emission laser was conducted together with changeover information written in a light signal. The length of the changeover information was set to 20 ns, which corresponds to an ordinary data transfer speed at present. As a result, it was found that the optical path of the input light was changed over based on the changeover information.

As described above, use of the thin film according to the present invention makes it possible to produce a device that can perform changeover or turning-ON/OFF of optical path efficiently and with low loss. While the changeover of optical path was evidenced in this example, it is possible to use the optical device as an optical shutter or a fuse, by absorbing the output light in either direction of the emission optical paths 4 and 6 by use of a filter for absorbing the light.

Example 4

An experiment for investigating the composition of a thin film was carried out. The angle of incidence of signal light was fixed to 70°. First, in the composition of the thin film, the content ratio of a metallic oxide to a glass component $SiO_2$ was set to 70:30 by weight, and the kind of the metallic oxide was varied. Table 4 shows the results.

TABLE 4

| Oxide | Crystal structure | Extinction coefficient at $\lambda$ = 1550 nm | Refractive index variation | Switching characteristics | Response speed |
|---|---|---|---|---|---|
| $Cr_2O_3$ | Corundum | 0.04 | 3.10% | ⊙ | 13 ns |
| $Al_2O_3$ | Corundum | 0.025 | 2.40% | ⊙ | 14 ns |
| $Ga_2O_3$ | Corundum | 0.026 | 2.00% | ⊙ | 14 ns |
| $Fe_2O_3$ | Corundum | 0.03 | 2.70% | ⊙ | 11 ns |
| ZnO | NaCl | 0.2 | 0.40% | X | — |
| $Fe_3O_4$ | Spinel | 0.27 | 3.20% | X | — |
| CoO | NaCl | 0.02 | 0% | X | — |

In the table, there are shown, from the left, the kind of metallic oxide, the crystal structure confirmed by a wide angle X-ray diffraction method, the extinction coefficient at a wavelength of 1550 nm, the variation of refractive index upon irradiation with excited light, the switching characteristics, and the response speed. The results show good properties with a refractive index variation of at least 2% and an extinction coefficient of not more than 0.04 in $Fe_2O_3$, $Cr_2O_3$, $Al_2O_3$, and $Ga_2O_3$ that have the corundum type crystal structure. The materials corresponding to a high extinction coefficient of the thin film have a low transmittance of light, with the result that the signal is attenuated or lost upon transmission or the like. For practical use, therefore, the extinction coefficient must be not more than 0.04 in the communication wavelength range.

Further, it was found that where the metallic oxide is $Fe_2O_3$, $Al_2O_3$ or $Ga_2O_3$, the extinction coefficient is 0.03 or less, i.e., the signal loss is further reduced. In addition, the use of $Fe_2O_3$ resulted in a larger variation of refractive index.

From the results it is seen that the thin films containing the crystal grains having the corundum type crystal structure have a low extinction coefficient and, therefore, can be applied to an optical device that shows little loss of signals.

Next, the ratio of the contents of the metallic oxide to the glass component contained in the thin film was investigated. The results of the case where the content ratio of $Fe_2O_3$ and $SiO_2$ was varied are shown in Table 5.

TABLE 5

| $Fe_2O_3$ (wt %) | $SiO_2$ (wt %) | Extinction coefficient at $\lambda$ = 1550 nm | Refractive index variation | Switching characteristics | Response speed |
|---|---|---|---|---|---|
| 100 | 0 | 0.07 | 2.70% | X | — |
| 95 | 5 | 0.03 | 2.70% | ⊙ | 14 ns |
| 90 | 10 | 0.03 | 2.80% | ⊙ | 12 ns |
| 80 | 20 | 0.026 | 2.90% | ⊙ | 13 ns |
| 70 | 30 | 0.3 | 2.80% | ⊙ | 13 ns |
| 60 | 40 | 0.028 | 2.80% | ⊙ | 12 ns |
| 50 | 50 | 0.025 | 2.70% | ⊙ | 12 ns |
| 40 | 60 | 0.029 | 2.70% | ⊙ | 12 ns |
| 30 | 70 | 0.028 | 2.70% | ⊙ | 11 ns |
| 20 | 80 | 0.018 | 0.40% | X | — |
| 10 | 90 | 0.014 | 0.20% | X | — |
| 0 | 100 | 0 | 0.00% | X | — |

In the table, there are shown, from the left, the content ratio of oxides, the extinction coefficient at a wavelength of 1550 nm, the variation of refractive index upon irradiation with excited light, the switching characteristic, and response speed. As a result, when the content of $Fe_2O_3$ reaches or exceeds 30%, the variation of refractive index becomes as high as more than 2%, and the switching characteristic was confirmed. However, the thin film with an $Fe_2O_3$ content of 100% had an extinction coefficient of as high as 0.07 and, therefore, could not show a switching characteristic although it showed a large variation of refractive index. An observation revealed that in thin films with an $Fe_2O_3$ content of not more than 30%, the iron compound forms a compound with $SiO_2$ or is present in an amorphous form. This seems to be the reason for the small variations of refractive index.

An addition of a rare earth element oxide to the above-mentioned thin films consisting of $Fe_2O_3$ and $SiO_2$ was investigated. $Er_2O_3$ was selected as the rare earth element oxide. Table 6 shows the results.

TABLE 6

| $Er_2O_3$ (wt %) | $Fe_2O_3$ (wt %) | $SiO_2$ (wt %) | Extinction coefficient at $\lambda$ = 1550 nm | Refractive index variation | Switching characteristics | Response speed |
|---|---|---|---|---|---|---|
| 0 | 70 | 30 | 0.03 | 2.70% | ⊙ | 11 ns |
| 1 | 69 | 30 | 0.027 | 3.10% | ⊙ | 0.4 ps |
| 2 | 68 | 30 | 0.028 | 3.20% | ⊙ | 0.5 ps |
| 5 | 65 | 30 | 0.027 | 3.10% | ⊙ | 0.3 ps |
| 10 | 60 | 30 | 0.026 | 3.20% | ⊙ | 0.3 ps |
| 15 | 55 | 30 | 0.025 | 3.20% | ⊙ | 0.4 ps |
| 20 | 50 | 30 | 0.026 | 3.10% | ⊙ | 0.5 ps |
| 25 | 45 | 30 | 0.028 | 3.20% | ⊙ | 0.3 ps |
| 30 | 40 | 30 | 0.029 | 3.10% | ⊙ | 0.3 ps |
| 35 | 35 | 30 | 0.027 | 0.40% | X | — |
| 40 | 30 | 30 | 0.025 | 0.40% | X | — |
| 45 | 25 | 30 | 0.022 | 0.40% | X | — |

In the table, there are shown, from the left, the content ratios of added $Er_2O_3$, $Fe_2O_3$ and $SiO_2$, the extinction coefficient at a wavelength of 1550 nm, the variation of refractive index upon irradiation with excited light, the switching characteristic, and the response speed. The content of $SiO_2$ was fixed to 30% based on the total weight of the thin film.

As a result it has been found that when the content of the rare earth element oxide was 1 to 30% by weight, the refractive index variation was as high as not less than 3%, the switching characteristic in terms of response speed was as very high as 0.5 ps or less. This result, in comparison with the results in Table 5 where the rare earth element oxide was not contained, is probably due to the fact that the refractive index variation was further enlarged, and, of the period of time until the refractive index returns to its original value, the portion of response on the ns order was small.

While the results of only $Er_2O_3$ as the rare earth element oxide are shown here, similar enhancement of characteristics was observed for other rare earth element oxides. As described above, the non-linear optical material according to the present invention, when a rare earth element oxide is added thereto, shows a shortened response time and, therefore, can be applied to high-speed optical switches.

Next, paying attention to the fact that, in Table 4, the refractive index varied little with ZnO but varied positively with $Fe_2O_3$, non-linear optical materials were investigated by adding ZnO. Table 7 shows the results.

TABLE 7

| $Fe_2O_3$ | ZnO | Mean grain diameter | Refractive index variation | Switching characteristics | Response speed |
|---|---|---|---|---|---|
| 100 | 0 | 20 nm | 2.70% | ⊚ | 11 ns |
| 90 | 10 | 21.4 nm | 2.80% | ⊚ | 13 ns |
| 80 | 20 | 22.1 nm | 2.90% | ⊚ | 13 ns |
| 70 | 30 | 22.9 nm | 2.80% | ⊚ | 12 ns |
| 60 | 40 | 23.4 nm | 2.80% | ⊚ | 13 ns |
| 50 | 50 | 24.1 nm | 2.60% | ⊚ | 13 ns |
| 40 | 60 | 24.8 nm | 2.50% | ⊚ | 12 ns |
| 30 | 70 | 25 nm | 2.60% | ⊚ | 13 ns |
| 20 | 80 | 26 nm | 0.40% | X | — |
| 10 | 90 | 28 nm | 0.40% | X | — |
| 0 | 100 | 30 nm | 0.40% | X | — |

In Table 7, there are shown, from the left, the content ratios of $Fe_2O_3$ and ZnO, the mean grain diameter, the variation of refractive index, and switching characteristics, and the response speed. $SiO_2$ was used in an amount of 30% by weight based on the total weight of the thin film. The mean grain diameter was determined by observation of the TEM image obtained by use of a transmission electron microscope (TEM).

The accelerating voltage was set to 200 kV. From the TEM image obtained, the area of a grain was calculated by use of an image analyzer, then a circle having that area was assumed, and the diameter of the circle was adopted as the grain diameter. The diameters of about 100 to 300 grains were analyzed from one specimen, and the mean of the grain diameters was adopted as the mean grain diameter.

Referring to the relationship between the ZnO content and the mean grain diameter, it has been found that the mean grain diameter increases as the amount of ZnO added increases. It has further been found that when ZnO was added to $Fe_2O_3$ in an amount of not less than 80%, the refractive index variation was small and, therefore, switching could not be achieved. This can be supposed to be due to the fact that the mean grain diameter exceeded 25 nm.

One of the mechanisms of occurrence of the refractive index variation in a non-linear optical material is the influence of the quantum effect of microcrystals on the energy band of the substance in question. It is presumed that when a material containing specific micro-grains is irradiated with excited light, polarization of the micro-grains occurs, which further influences the energy band, causing a larger refractive index. From the above results, the upper limit of the mean grain diameter for the occurrence of the quantum effect is 25 nm. Therefore, it has been found that the switching characteristics depend on the grain diameter of the crystal grains, and good switching characteristics can be obtained where the mean grain diameter is not more than 25 nm.

From the present example as described above, it has been found that an optical device showing a very high-speed response time of 0.5 ps to 15 ns and little loss of light signals can be produced by optimization of the thin film composition.

Example 5

In Examples 1 to 4, laser light (excited light) has been used as an external field. In Example 5, an examination was conducted in which electricity or a heater was used as an external field for varying the refractive index of an optical thin film.

Figure 8A:
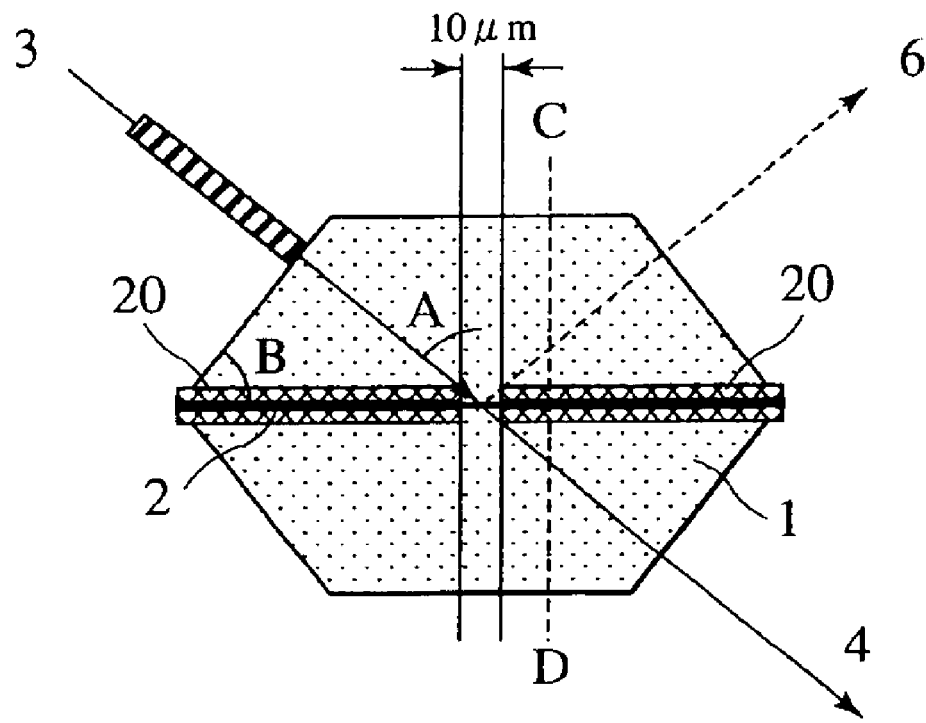
FIG. 8A illustrates a method of electrically driving a non-linear optical device.
Figure 8B:
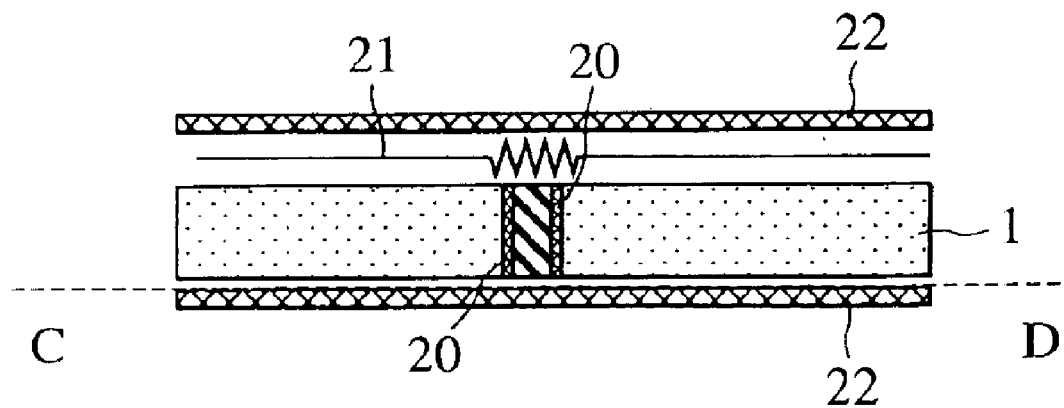
FIG. 8B illustrates a method of driving a non-linear optical device by a heater.

FIGS. 8A and 8B show schematic diagrams. In FIG. 8A, numeral 20 denotes Cr electrodes formed on both sides of a thin film. The Cr electrode was formed in a film thickness of 100 nm by a sputtering method. In this case, in order that signal light would not be incident on the electrodes, after the formation of the electrodes, the electrodes at peripheral areas on which signal light is incident were removed by about 10 μm by an ion milling method using a mask.

Here, a pulse voltage (the width of one pulse: 10 ns; the interval between pulses: 1 kHz) was impressed between the Cr electrodes 24 and 25, and a voltage of 40 V was impressed on the non-linear optical film 2. As a result, a change of the optical path of the emitted light was observed, in the same manner as in the preceding examples in which irradiation with excited light 11 was conducted.

In addition, a heater wire 21 was disposed as shown in FIG. 8B, and a pulse voltage with a width of 1 μs, an interval of 1 kHz and an impressed voltage of 40 V was impressed thereon to heat the thin film, thereby conducting switching. In this instance, a heat radiator 22 was disposed in the surroundings of the thin film so that heat is dissipated from the thin film upon stoppage of heating. As a result, a change of the optical path of the emitted light was observed in the case of applying heat as with the cases where irradiation with excited light or application of a voltage was adopted.

This example has revealed that it is possible to produce optical switches of the electric driving type and of the heat driving type. However, the response time was on the order of 100 ns in the case of using electricity as the external and was on the order of 2 μs in the case of using heat as the external field; thus, a highest-speed switch can be produced in the case where excited light is used as the external field.

Example 6

In order to conduct switching, it is necessary to change the refractive index of the thin film between a value higher than that of the substrate and a value lower than that of the substrate. However, where the refractive indexes of the substrates do not coincide due to substrate compositions, forming conditions thereof or the like, a refractive index adjusting film having a high transmittance and an appropriate refractive index may be formed each on the upper and lower sides of the non-linear optical film 2. More specifically, where the refractive index (e.g., 1.8) of the non-linear optical film 2 is changed to 2.0 upon irradiation with light, the refractive indexes of the substrates 1 must be set to a value in the range of 1.8 to 2.0, e.g., to 1.9. However, where the substrate has a refractive index of 1.6, an adjusting film may be produced on the inside thereof.

Figure 9:
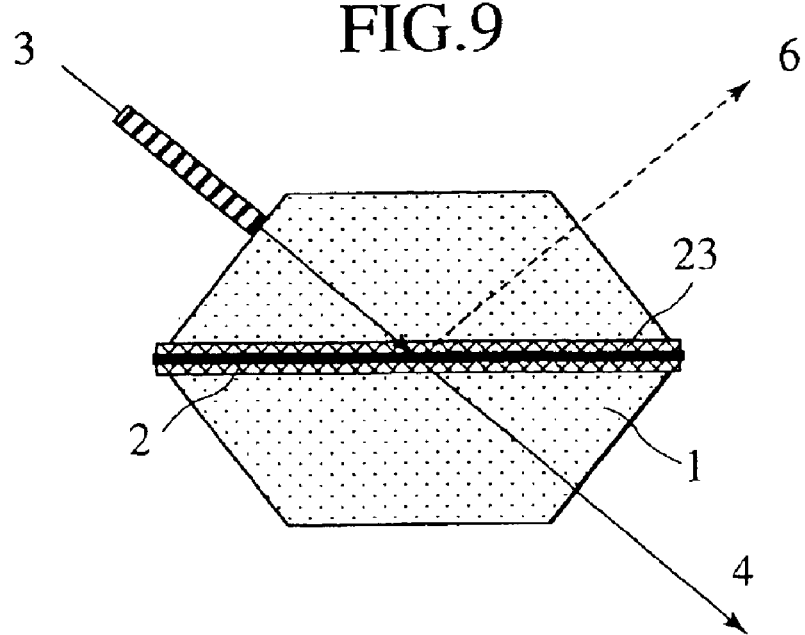
FIG. 9 shows an optical device in which a refractive index adjusting film is formed.

An optical device was produced in which thin films of silicon nitride as refractive index adjusting films 23 were formed respectively between the substrates 1 and the non-linear optical film 2 by sputtering. FIG. 9 shows a schematic diagram of the optical device. $Si_3N_4$ has a refractive index of 1.9 to 2.0, and has a very high transmittance. Therefore, even where the refractive index variation region of the non-linear optical film 2 does not conform to the substrates 1, an optical device can be produced by providing a refractive index adjusting film on each of the substrates. In addition, an optical device can be produced by use of substrates of which the refractive indexes do not conform to the non-linear optical thin film.

According to the present invention, it is possible to provide a non-linear optical material that is applicable to optical devices, and an optical device that shows little loss of signals.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. An optical device capable of changing signal light to a plurality of paths, comprising a film, a heating source attached to the film, and a heat radiator plate attached to the other portion of the film, wherein the refractive index of the film varies according to heat excitation and the film comprises crystal grains of an oxide and amorphous portions present between the crystal grains.

2. An optical device capable of changing a signal light to a plurality of paths, comprising a film wherein the refractive index of the film varies according to at least one of light excitation, voltage application and heat excitation and the film comprises crystal grains of an oxide and amorphous portions present between the crystal grains, and wherein the device further comprising a light absorption member in a part of the paths of the signal light.

* * * * *